(12) United States Patent
Radhakrishnan et al.

(10) Patent No.: US 8,839,635 B2
(45) Date of Patent: Sep. 23, 2014

(54) HIGH EFFICIENCY DOUBLE-EFFECT CHILLER HEATER APPARATUS

(75) Inventors: Blau Radhakrishnan, Pune (IN); Babu Panneerselvam, Pune (IN); Swapna Kulkarni, Pune (IN)

(73) Assignee: Thermax Limited, Maharashtra (IN)

( * ) Notice: Subject to any disclaimer, the term of this patent is extended or adjusted under 35 U.S.C. 154(b) by 883 days.

(21) Appl. No.: 13/032,675

(22) Filed: Feb. 23, 2011

(65) Prior Publication Data

US 2011/0225991 A1 Sep. 22, 2011

(30) Foreign Application Priority Data

Mar. 18, 2010 (IN) .......................... 718/MUM/2010

(51) Int. Cl.
*F25B 15/00* (2006.01)
*F25B 15/06* (2006.01)
*F25B 29/00* (2006.01)
*F25B 27/02* (2006.01)

(52) U.S. Cl.
CPC .............. *F25B 15/008* (2013.01); *F25B 15/06* (2013.01); *F25B 29/006* (2013.01); *F25B 27/02* (2013.01); *Y02B 30/625* (2013.01)
USPC .............................. 62/104; 62/238.3; 62/481

(58) Field of Classification Search
USPC .......................... 62/104, 481, 495, 497, 238.3
See application file for complete search history.

(56) References Cited

U.S. PATENT DOCUMENTS

| 4,290,273 A | 9/1981 | Mecklor |
| 4,505,123 A | 3/1985 | Kusakabe et al. |

FOREIGN PATENT DOCUMENTS

WO 9417343 8/1994

*Primary Examiner* — Cassey D Bauer
(74) *Attorney, Agent, or Firm* — Cowan, Liebowitz & Latman, P.C.; Mark Montague

(57) ABSTRACT

The absorption chiller-heater apparatus of present invention utilizes a portion of direct heat, used to heat water, for providing the refrigeration effect. The external heat input required for providing refrigeration is minimal; hence, the efficiency of the apparatus is increased by 30-40% over the conventional systems. Further, as the quantum of the external heat source required for a new cycle is reduced, the size of the high temperature generator required, is smaller, which results in lower capital costs. The apparatus provides chilled water which can be used for various industrial purposes. The absorption chiller-heater reduces $CO_2$ emissions and utilizes a single arrangement to produce both heating and refrigeration effect. Thus, additional electrical and heat input or separate components are not required.

13 Claims, 7 Drawing Sheets

HIGH EFFICIENCY DOUBLE-EFFECT CHILLER HEATER APPARATUS

FIELD OF INVENTION

The present invention relates to a system for generating hot water.

The present invention relates to a system for simultaneously obtaining hot fluid and refrigeration effect, with higher efficiencies as compared to existing vapor absorption chiller-heater machines.

DEFINITION OF TERM USED IN THE SPECIFICATION

The term "heat reclaimer" used in the specification means equipment designed to capture waste/left-over heat from a heat input which otherwise will be lost.

BACKGROUND

Several industrial processes require hot water in the range of 60-80° C. for heating applications, like paint booth in automobile industry, paper industry, food industry, hotels, and the like. Extensive amount of energy is consumed during the heating application, which adds to the operating costs of the process. Generally, the energy sources used for heating water are fossil fuels including natural gas, liquefied petroleum gas, oil, or solid fuels. These fuels may be consumed directly or by the use of electricity, which may be derived from the above mentioned energy sources. Alternatively, hot water can be generated using solar energy, heat pumps, hot water heat recycling or geothermal heating. The hot water thus generated is sent to the application point where it loses the heat and is then recycled to the hot water generating system.

These industries also require chilled water/refrigeration for the various process applications. Refrigeration is commonly used in industries to liquefy gases like oxygen, nitrogen, propane and methane; in compressed air purification to condense water vapor from compressed air to reduce its moisture content; in oil refineries, chemical plants and petrochemical plants to maintain a low process temperature; and metallurgy industries to temper steel and cutlery. The chiller apparatus commonly used in industrial operations are based on a vapor compression or a vapor absorption cycle. Absorption chiller apparatus are thermally driven, which means that heat rather than mechanical energy is supplied to drive the cycle. Further, absorption chiller apparatus for space conditioning are often gas-fired, while industrial installations are usually driven by high-pressure steam or waste heat. The absorption systems utilize the ability of liquids or salts to absorb vapors of a working fluid to obtain the heating and the cooling effect.

The vapor compression cycle uses high grade energy from mechanical inputs while the vapor absorption cycle uses energy input from waste heat or heat derived from solar collectors. Thus, vapor absorption machines substantially reduce the operating costs as they use low-grade waste heat. Also, the vapor absorption systems use non-ozone depleting refrigerants (water) and require much lesser electricity compared to the vapor compression systems. These systems are even more beneficial for industrial applications where waste heat can be used to generate steam/hot water.

The awareness and need for energy conservation has highlighted concerns about the environment, leading to increase in research and development of energy efficient heating and cooling systems. Increased attention has been directed towards development of cost-effective and efficient systems that can provide heating and cooling, thus, reducing the consumption of energy. As a result, the vapor absorption systems are gaining favor over conventional vapor compression systems in industrial applications, as they use little energy and are environmental friendly.

The basic vapor absorption cycle employs two fluids, the refrigerant and the absorbent. Most commonly, lithium bromide (Li—Br)—water are used as the absorbent-refrigerant pair. In the absorption cycle the low-pressure refrigerant vapor is absorbed into the absorbent releasing a large amount of heat. The liquid refrigerant/absorbent solution is pumped to a high-operating pressure generator, where heat is provided from a gas burner, steam, hot water or hot gases. The heat causes the refrigerant to be desorbed from the absorbent and vaporize. These vapors flow to a condenser, where the heat is rejected and the refrigerant is condensed to liquid refrigerant. The liquid refrigerant is then passed to a low-pressure evaporator, where it evaporates by absorbing heat from chilled water flowing through its tubes and providing the cooling effect. The absorbent in the generator after desorbing refrigerant vapors is sent to absorber where it is recombined with the low-pressure refrigerant vapors returning from the evaporator, repeating the cycle. These systems utilize heat source such as steam, hot water or hot gases leaving a boiler, turbine or engine generators.

A vapor absorption chiller heater apparatus is a system wherein the vapor absorption technology can be used to obtain both hot water and refrigeration effect simultaneously. With stringent pollution control regulations, application of chiller heater apparatus in industries has become important, since the technology helps to reduce emissions, improves efficiency, and limits the use of ground water for cooling.

Several attempts have been made for providing a vapor absorption chiller heater which provides simultaneous heating and refrigeration effect. Some of these disclosures are listed in the prior art below:

Accordingly, U.S. Pat. No. 4,290,273 discloses a chiller and heat pump system employing the Peltier effect in which a steam-jet refrigeration unit is associated with a condenser and an evaporator absorption unit. Peltier effect absorption is conducted thermo-electrically and separately discharges high temperature water and strong absorbent liquid. The high pressure water is passed through a flash chamber for conversion to steam and to reduce its temperature and pressure values to those required for the steam-jet refrigeration unit. The high temperature strong absorbent is passed through a heat exchanger so as to recover heat into the weak absorbent feed to the generator. The steam-jet refrigeration unit separately discharges high temperature steam passed through the condenser means to change its condition to liquid and to transfer heat into a space heating circuit when desired. During simultaneous heating and cooling mode, the chiller and heat pump system disclosed in U.S. Pat. No. 4,290,273A cannot produce temperature required for industrial application. The chiller and heat pump system disclosed in U.S. Pat. No. 4,290,273A is complicated in construction and requires valves for diverting the flow of the absorbent liquid using temperature sensors.

Again, U.S. Pat. No. 4,505,123 discloses an absorption heat pump system having a generator, a condenser, an evaporator and an absorber connected hermetically to form closed cycles for a refrigerant and an absorbent. A control means is disposed in the refrigerant passage leading from the condenser to the evaporator and is adapted to continuously control the temperature or flow rate of the liquid refrigerant, so as to stabilize the temperature in the evaporator. The control means of U.S. Pat. No. 4,505,123 require a liquid refrigerant heater in heat exchanging relation with the refrigerant passage for heating the refrigerant. The requirement of a refrigerant heater increases the cost of the system.

Again, WO 1994017343 discloses a heat pump and refrigeration system including an evaporator from which refrigerant vapour is withdrawn by an absorber and an absorbent is recharged by a generator. Further, a condenser is provided between the generator and the evaporator so that refrigerant vapour from the generator can be condensed prior to being returned to the evaporator. In addition, the system is provided with an ejector which is positioned downstream of the evaporator so as to withdraw refrigerant vapour from same and upstream of the condenser so that said withdrawn refrigerant vapour passes through the ejector to the condenser. The use of the ejector complicates the circulation of the refrigerant vapour to the absorber and also adds to the cost of the system. The system disclosed in WO 1994017343 cannot be used to produce high temperature for industrial application Therefore, there is felt a need for a vapor absorption chiller-heater apparatus that minimizes or eliminates one or more of the shortcomings listed in the prior art above.

OBJECTS OF THE INVENTION

An object of the present invention is to provide an absorption chiller-heater apparatus for producing hot fluid along with refrigeration effect.

Another object of the present invention is to provide an absorption chiller-heater apparatus which substantially reduces the quantity of fuel utilized for providing simultaneous heating and refrigeration effect.

Yet another object of the present invention is to provide an absorption chiller-heater apparatus for producing refrigeration effect which does not use chlorofluorocarbons and thus reduces the carbon dioxide emissions.

Still another object of the present invention is to provide an absorption chiller-heater apparatus which does not require additional electrical or heat input to produce the refrigeration effect.

Still one more object of the present invention is to provide an absorption chiller-heater apparatus for producing heating and refrigeration effect which reduces the overall initial capital investment.

Another object of the present invention is to produce better efficiency and control in part load.

SUMMARY OF THE INVENTION

In accordance with the present invention, there is disclosed an absorption chiller-heater apparatus for providing heating and refrigeration, said apparatus comprising: a high temperature generator, a hot-water heat exchanger, a high temperature heat exchanger, a low temperature generator, a low temperature heat exchanger, a recovery heat exchanger, a condenser, an evaporator, and an absorber, and optionally comprising: a heat reclaimer;
characterized in that:
the high temperature generator is selectively connected in communication with a first set of equipment selected from the group of sets of equipment consisting of: (i) the hot-water heat exchanger, the high temperature heat exchanger, the low temperature generator, and the heat reclaimer; and (ii) the hot-water heat exchanger, the high temperature heat exchanger, and the low temperature generator;

the hot-water heat exchanger is operatively connected to be in communication with a set of equipment selected from the high temperature generator and the recovery heat exchanger, wherein, the hot-water heat exchanger is operatively connected to at least one equipment selected from a group of equipments consisting of the condenser and the evaporator, via the recovery heat exchanger;

the high temperature heat exchanger is selectively connected in communication with a second set of equipment selected from the group of sets of equipment consisting of: (i) the high temperature generator, the low temperature generator, and the low temperature heat exchanger; (ii) the high temperature generator, the low temperature generator, the low temperature heat exchanger, and the recovery heat exchanger; (iii) the high temperature generator, the low temperature heat exchanger, and the recovery heat exchanger; and (iv) the high temperature generator, the low temperature heat exchanger, and the absorber;

the low temperature generator is selectively connected in communication with a third set of equipment selected from the group of sets of equipment consisting of: (i) the high temperature generator, the high temperature heat exchanger, the low temperature heat exchanger, and the recovery heat exchanger; and (ii) the high temperature generator, the low temperature heat exchanger, and the recovery heat exchanger;

the low temperature heat exchanger is operatively connected to be in communication with the low temperature generator, the high temperature heat exchanger, and the absorber;

the recovery heat exchanger is selectively connected in communication with a fourth set of equipment selected from the group of sets of equipment consisting of: (i) the low temperature generator, the hot-water heat exchanger, the absorber, the condenser, and the heat reclaimer; (ii) the low temperature generator, the hot-water heat exchanger, the absorber, the condenser, and the high temperature heat exchanger; and (iii) the low temperature generator, the hot-water heat exchanger, the absorber, and the condenser;

the heat reclaimer is operatively connected to be in communication with the recovery heat exchanger and the high temperature generator;

the condenser is operatively connected to be in communication with the recovery heat exchanger, the absorber, and the evaporator;

the evaporator is operatively connected to be in communication with the condenser; and the absorber is selectively connected in communication with a fifth set of equipment selected from the group of sets of equipment consisting of: (i) the condenser, the low temperature heat exchanger, and the recovery heat exchanger; and (ii) the condenser, the low temperature heat exchanger, the recovery heat exchanger, and the high temperature heat exchanger.

Typically, in accordance with the present invention, said apparatus for providing heating and refrigeration comprises:
the high temperature generator, to receive a heated absorbent solution having concentration between 50-62% from the high temperature heat exchanger, being adapted to boil the absorbent solution using heat input having temperature between 130-220° C., to provide a heated absorbent solution having concentration between 57-64% which is passed to the high temperature heat exchanger, and refrigerant vapors which are conveyed to the hot-water heat exchanger and the low temperature generator;

the hot-water heat exchanger, to receive a portion of the refrigerant vapors from the high temperature generator, being adapted to transfer the heat there from to water, to provide hot water having temperature between 45-95° C., condensing the refrigerant vapors to form a refrigerant condensate to be circulated to at least one equipment selected from a group of equipments consisting of the condenser and the evaporator, via the recovery heat exchanger;

the high temperature heat exchanger, to receive a absorbent solution having concentration between 50-62%, the absorbent solution being selected from the group consisting of a partly heated absorbent solution and a cooled absorbent solution, from at least one equipment selected from the group consisting of the low temperature heat exchanger, the recovery heat exchanger, the low temperature generator, and the absorber, and a heated absorbent solution having concentration between 57-64% from the high temperature generator, being adapted to transfer heat between the absorbent solutions, to provide a heated absorbent solution having concentration between 50-62% which is fed to the high temperature generator and a partly heated absorbent solution having concentration between 57-64% to be communicated to an equipment selected from the group consisting of the low temperature generator and the low temperature heat exchanger;

the low temperature generator, to receive a portion of the refrigerant vapors from the high temperature generator, and a partly heated absorbent solution having concentration between 50-62% from at least one equipment selected from the group consisting of the high temperature heat exchanger, the low temperature heat exchanger, and the recovery heat exchanger, being adapted to use the heat from the refrigerant vapors to boil the absorbent solution, to provide a heated absorbent solution having concentration between 57-64% which is communicated to at least one equipment selected from the group consisting of the low temperature heat exchanger and the high temperature heat exchanger, the refrigerant vapors becoming a refrigerant condensate which is fed to the recovery heat exchanger;

the low temperature heat exchanger, to receive a cooled absorbent solution having concentration between 50-57% from the absorber, and a heated absorbent solution having concentration between 62-64% from at least one equipment selected from the group consisting of the low temperature generator and the high temperature heat exchanger, being adapted to transfer heat between the absorbent solutions, to provide a cooled absorbent solution having concentration between 62-64% which is sprayed in the absorber, and a partly heated absorbent solution having concentration between 50-57% which is conveyed to at least one equipment selected from the group consisting of the low temperature generator and the high temperature heat exchanger;

the recovery heat exchanger, to receive the cooled absorbent solution having concentration between 50-57% from the absorber, and the refrigerant condensate from at least one equipment selected from the group of equipments consisting of the low temperature generator and the hot-water heat exchanger, being adapted to extract heat from the refrigerant condensate to the absorbent solution, the cooled refrigerant condensate is transmitted to the condenser, and a partly heated absorbent solution having concentration between 50-57% is provided, which is conveyed to at least one equipment selected from the group consisting of the high temperature heat exchanger, and the low temperature generator;

the condenser, to receive the cooled refrigerant condensate from the recovery heat exchanger and cooling water from the absorber, being adapted to further condense the cooled refrigerant condensate, to provide a further condensed cooled refrigerant;

the evaporator, cooperating with the absorber, adapted to receive the further condensed cooled refrigerant from the condenser and water having temperature in the range of 10-20° C., the further condensed cooled refrigerant absorbs heat from the water and becomes refrigerant vapors, and thereby provides chilled water having temperature in the range of 0-10° C.; and the absorber, cooperating with the evaporator to receive the refrigerant vapors, wherein the cooled absorbent solution having concentration between 62-64% is sprayed in the absorber, being adapted to absorb the refrigerant vapors, causing the absorbent solution to dilute, thereby becoming a cooled absorbent solution having concentration between 50-57% which is circulated to at least one equipment selected from the group consisting of the low temperature heat exchanger, the recovery heat exchanger and the high temperature heat exchanger; cooling water is circulated through the absorber to remove the heat of dilution.

Preferably, in accordance with the present invention, said apparatus comprises the heat reclaimer to receive the partly heated absorbent solution having concentration between 50-57% from the recovery heat exchanger and an used heat input from the high temperature generator, being adapted to extract the remaining heat from the heat input to the partly heated absorbent solution, to provide a heated absorbent solution having concentration between 50-57%, which is conveyed to the high temperature generator.

Typically, in accordance with the present invention, the recovery heat exchanger is at least one equipment selected from the group of equipments consisting of a drain heat exchanger and a heat recovery heat exchanger, wherein, the heat recovery heat exchanger is operatively connected to be in communication with the hot-water heat exchanger for receiving the refrigerant condensate.

Typically, in accordance with the present invention, refrigerant-absorbent pair is water-lithium-bromide (Li—Br).

In accordance with the present invention, heat input is selected from the group consisting of steam, fuel, and exhaust gas.

In accordance with the present invention, is disclosed a method for providing refrigeration and heating using an absorption chiller-heater apparatus, said method comprising the following steps:

boiling a heated absorbent solution having concentration between 50-62% in the high temperature generator using a heat input having temperature between 130-220° C., providing a heated first absorbent solution having concentration between 57-64%, and releasing refrigerant vapors;

receiving a portion of the refrigerant vapors in a hot-water heat exchanger for heating water, the refrigerant vapors condensing to become a refrigerant condensate, and providing hot water having temperature between 45-95° C.;

extracting heat from the heated first absorbent solution leaving the high temperature generator in a high temperature heat exchanger, providing a partly heated first absorbent solution having concentration between 57-64%;

concentrating a partly heated absorbent solution having concentration between 50-62% in a low temperature generator, by using a portion of the refrigerant vapors from the high temperature generator, the refrigerant vapors condensing in the process, providing a heated second absorbent solution having concentration between 57-64%;

transmitting heat from the heated second absorbent solution leaving the low temperature generator, in a low temperature heat exchanger, providing a cooled second absorbent solution having concentration between 57-64%;

extracting heat from the refrigerant condensate leaving the hot-water heat exchanger and the low temperature generator, in a recovery heat exchanger which comprises at least one equipment selected from a drain heat exchanger and a heat recovery heat exchanger, providing a cooled refrigerant condensate;

receiving the cooled refrigerant condensate in a condenser, for further condensation, by giving heat to cooling water circulated there through, providing a further condensed cooled refrigerant;

passing water having temperature between 10-20° C. through an evaporator, in which, the further condensed cooled refrigerant absorbs heat from the water to form refrigerant vapors, providing chilled water having temperature between 0-10° C.;

absorbing the refrigerant vapors released in the evaporator, in an absorber which receives a cooled absorbent solution having concentration between 62-64%, the absorption resulting in dilution of the absorbent solution to 50-57% concentration, the heat of dilution generated during the process is removed by passing cooling water through the absorber;

heating the absorbent solution having concentration between 50-57%, in at least one equipment selected from the group consisting of the low temperature heat exchanger, the recovery heat exchanger, and the high temperature heat exchanger, providing a heated absorbent solution having concentration between 50-57%; and concentrating the heated absorbent solution in at least one equipment selected from the group consisting of the low temperature generator and the high temperature generator.

Typically, in accordance with the present invention, the method for providing refrigeration and heating includes the step of transferring heat from the heated first absorbent solution to the heated second absorbent solution in the high temperature heat exchanger.

Preferably, in accordance with the present invention, the method for providing refrigeration and heating includes the step of concentrating the partly heated first absorbent solution, having concentration between 57-62%, in the low temperature generator.

Typically, in accordance with the present invention, the method for providing refrigeration and heating includes the step of boiling the heated second absorbent solution, having concentration between 57-62%, in the high temperature generator.

Preferably, in accordance with the present invention, the method for providing refrigeration and heating includes the step of extracting heat from the partly heated first absorbent solution in the low temperature heat exchanger.

In accordance with the present invention, the method for providing refrigeration and heating includes the step of extracting the left-over heat from the used heat input, in a heat reclaimer, for heating the absorbent solution leaving the absorber.

Alternatively, in accordance with the present invention, the method for providing refrigeration and heating includes the step of extracting heat from the refrigerant condensate leaving the hot-water heat exchanger in the heat recovery heat exchanger.

BRIEF DESCRIPTION OF THE ACCOMPANYING DRAWINGS

The invention will now be described with the help of the accompanying drawings, in which, FIG. 1 illustrates a conventional absorption chiller-heater apparatus;

DETAILED DESCRIPTION OF THE ACCOMPANYING DRAWINGS

The present invention will now be described with reference to the accompanying drawings which do not limit the scope and ambit of the invention. The description provided is purely by way of example and illustration.

Figure 1:
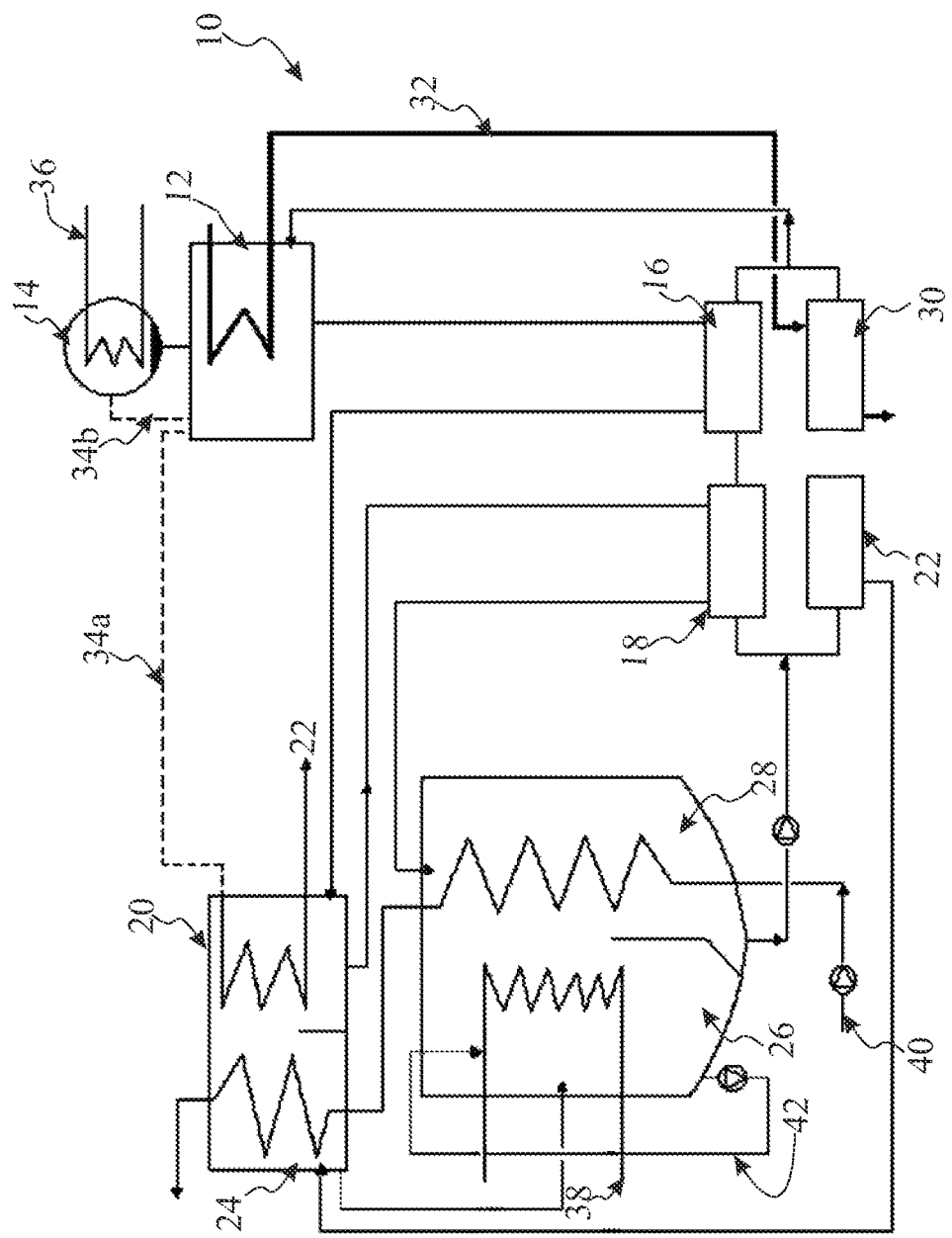

A conventional vapor absorption chiller-heater apparatus, represented in FIG. 1 by numeral 10, is a double-effect vapor absorption machine having a chiller and a heater, operating simultaneously but independently, the absorption chiller-heater apparatus 10 comprises: a high temperature generator 12, a hot-water heat exchanger 14, a high temperature heat exchanger 16, a low temperature generator 20, a low temperature heat exchanger 18, a drain heat exchanger 22, a condenser 24, an evaporator 26, an absorber 28, and a heat reclaimer 30. In the high temperature generator 12, a heat input 32 is provided, which has to independently cater to the refrigeration load and the heating load. A absorbent solution is circulated through the apparatus 10. A dilute absorbent solution leaving the absorber 28, is circulated through a series of equipment selected from: the low temperature heat exchanger 18, a high temperature heat exchanger 16, a drain heat exchanger 22 and a heat reclaimer 30. The absorbent solution is then concentrated, selectively, in the high temperature generator 12 and the low temperature generator 20. The heat carried by the concentrated absorbent solution, leaving the high temperature generator 12 and the low temperature generator 20, is used to heat the dilute absorbent solution, in the low temperature heat exchanger 18 and the high temperature heat exchanger 16, before spraying the concentrated absorbent solution in the absorber 28.

In the high temperature generator 12, the refrigerant is vaporized, when concentrating the dilute absorbent solution, forming refrigerant vapors, a major portion of which is used in the low temperature generator 20, received via line 34*a*, for further concentrating the concentrated absorbent solution from the high temperature generator 12. The refrigerant vapors condense in the low temperature generator 20; the heat from the refrigerant condensate is extracted to the dilute absorbent solution from the absorber 28, in the drain heat exchanger 22, where in the drain heat exchanger 22 the refrigerant condensate is still condensed. The refrigerant condensate is sent to the condenser 24, where, by giving heat to cooling water circulated there through via line 40, the refrigerant is further condensed. The further condensed refrigerant is then sprayed in the evaporator 26, where, in the evaporator 26, cold water is passed through the evaporator tubes through the line 38, the further condensed refrigerant takes heat from this cold water to generate refrigerant vapors and provide chilled water. In the apparatus 10, the absorber 28 cooperates with the evaporator 26 to receive the refrigerant vapors. The concentrated absorbent solution, sprayed in the absorber 28, absorbs the refrigerant vapors released in the evaporator 26, and becomes a dilute absorbent solution which is subsequently discharged from the absorber 28. Heat of dilution is generated during the absorption process, which is removed by cooling water circulated through line 40 in the absorber 28; and refrigerant is continuously sprayed in the evaporator 26, through the line 42, using the refrigerant pump.

A nominal portion of the refrigerant vapors, generated in the high temperature generator 12, is supplied to the shell side of the hot-water heat exchanger 14, received via line 34*b*, where heat in the refrigerant vapors is transferred to water circulated through the heat exchanger tubes 36, to provide hot water. The refrigerant condensate, generated in the hot-water heat exchanger 14, is returned to the high temperature generator 12, which therefore, requires an excess of heat input 32 for providing heat equivalent to heat load required in the hot water heat exchanger 14. The conventional absorption chiller-heater apparatus 10 can be used primarily for heating applications by passing the refrigerant vapors directly from the high temperature generator 12 to the hot-water heat exchanger 14, This means that the heat input 32 provided in the high temperature generator 12 has to cater independently to the refrigeration load and the heating load. Hence, when operating the conventional absorption chiller-heater apparatus 10, a considerable amount of fuel firing is required for providing both heating and refrigeration simultaneously, thus, the apparatus 10 is uneconomical.

The present invention is discussed here below, exemplifying the various possible embodiments. The present invention envisages a high-efficiency absorption chiller-heater apparatus, for providing heating and refrigeration, which smartly utilizes the energy therein, thereby decreasing the wastage of energy, and thus, providing elaborate fuel savings, approximately 30-40% in comparison with the conventional absorption chiller-heater apparatus 10, also, the apparatus of present invention does not use chlorofluorocarbons in the refrigeration cycle, which helps in reducing the carbon dioxide emission.

Referring to the FIGS. 2-7, is illustrated the absorption chiller-heater apparatus in accordance with the present invention. The apparatus comprises: a high temperature generator 102, a hot-water heat exchanger 104, a high temperature heat exchanger 106, a low temperature generator 110, a low temperature heat exchanger 108, a recovery heat exchanger 112, a condenser 114, an evaporator 116, and an absorber 118, and, optionally comprising: a heat reclaimer 120. In the various embodiments of the present invention, as illustrated in the FIGS. 2-7, the several components of the apparatus are arranged selectively.

The high temperature generator 102 is connected in communication with a first set of equipment selected from the group of sets of equipment consisting of: (i) the hot-water heat exchanger 104, the high temperature heat exchanger 106, the low temperature generator 110, and the heat reclaimer 120; and (ii) the hot-water heat exchanger 104, the high temperature heat exchanger 106, and the low temperature generator 110. The hot-water heat exchanger 104 is operatively connected to be in communication with the high temperature generator 102 and the recovery heat exchanger 112, wherein, the hot-water heat exchanger 104 is operatively connected to at least one equipment selected from a group of equipments consisting of the condenser 114 and the evaporator 116, via the recovery heat exchanger 112. The high temperature heat exchanger 106 is connected in communication with a second set of equipment selected from the group of sets of equipment consisting of: (i) the high temperature generator 102, the low temperature generator 110, and the low temperature heat exchanger 108; (ii) the high temperature generator 102, the low temperature generator 110, the low temperature heat exchanger 108, and the recovery heat exchanger 112; (iii) the high temperature generator 102, the low temperature heat exchanger 108, and the recovery heat exchanger 112; and (iv) the high temperature generator 102, the low temperature heat exchanger 108, and the absorber 118. The low temperature generator 110 is connected in communication with a third set of equipment selected from the group of sets of equipment consisting of: (i) the high temperature generator 102, the high temperature heat exchanger 106, the low temperature heat exchanger 108, and the recovery heat exchanger 112; and (ii) the high temperature generator 102, the recovery heat exchanger 112, and the low temperature heat exchanger 108. The low temperature heat exchanger 108 is operatively connected to be in communication with the low temperature generator 110, the high temperature heat exchanger 106, and the absorber 118. The recovery heat exchanger 112, comprising at least one equipment selected from a drain heat exchanger and a heat recovery heat exchanger, is connected in communication with a fourth set of equipment selected from the group of sets of equipment consisting of: (i) the low temperature generator 110, the hot-water heat exchanger 104, the absorber 118, the condenser 114, and the heat reclaimer 120; (ii) the low temperature generator 110, the hot-water heat exchanger 104, the absorber 118, the condenser 114, and the high temperature heat exchanger 106; and (iii) the low temperature generator 110, the hot-water heat exchanger 104, the absorber 118, and the condenser 114. The heat reclaimer 120 is operatively connected to be in communication with the recovery heat exchanger 112 and the high temperature generator 102. The condenser 114 is operatively connected to be in communication with the recovery heat exchanger 112, the absorber 118, and the evaporator 116. The evaporator 116 is operatively connected to be in communication with the condenser 114. The absorber 118 is connected in communication with a fifth set of equipment selected from the group of sets of equipment consisting of: (i) the condenser 114, the low temperature heat exchanger 108, and the recovery heat exchanger 112; and (ii) the condenser 114, the low temperature heat exchanger 108, the recovery heat exchanger 112, and the high temperature heat exchanger 106.

A concentrated absorbent solution having concentration between 62-64% is received in the absorber 118 from the low temperature heat exchanger 108, wherein the absorber 118 cooperates with the evaporator 116 in the apparatus. The evaporator 116 receives a condensed refrigerant from the condenser 114 and water having temperature in the range of 10-20° C. is circulated through the evaporator tubes, generally represented by numeral 128. During the operation of the apparatus the evaporator 116 is sprayed with refrigerant by using a pump, generally represented by line 132. The condensed refrigerant extracts heat from the circulating water to form refrigerant vapors, consequently chilling the water to a temperature in the range of 0-10° C., to provide refrigeration. The refrigerant vapors so formed are communicated to the absorber 118 where they are absorbed by the concentrated absorbent solution. Due to absorption of refrigerant vapors, the concentrated absorbent solution becomes dilute to 50-57% concentration and heat of dilution is released. This heat of dilution is removed by cooling water having temperature in the range of 25-40° C. circulated through the absorber tubes, generally represented by numeral 130. The dilute absorbent solution having concentration in the range of 50-57% is discharged from the absorber 118. Typically, the absorbent pair used in the absorption chiller-heater apparatus of the present invention is water-lithium-bromide (Li—Br).

Figure 2:
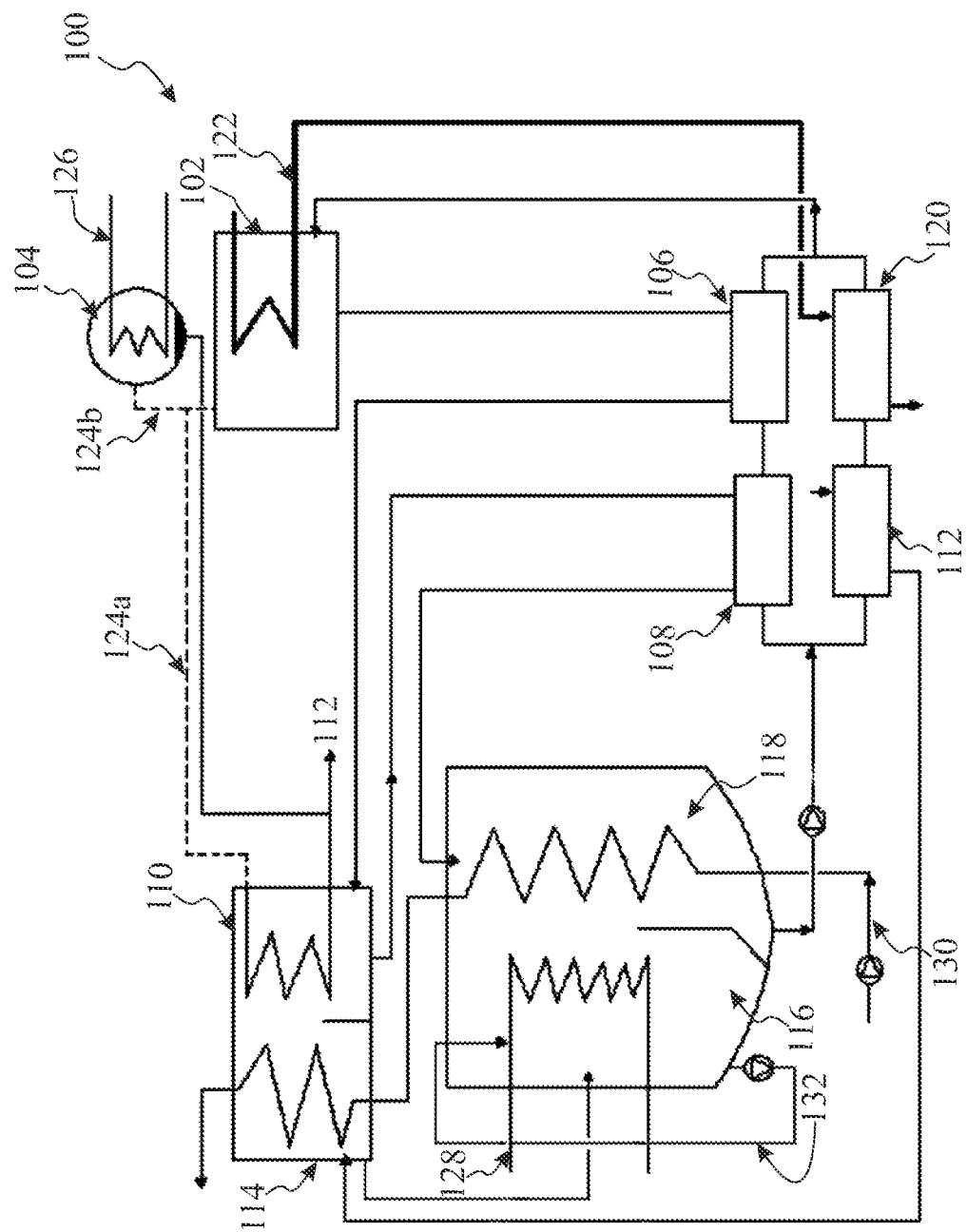
FIG. 2 illustrates an embodiment of the absorption chiller-heater apparatus in accordance with the present invention.

FIG. 2 illustrates an embodiment of the absorption chiller-heater apparatus in accordance with the present invention, the embodiment generally represented by numeral 100. The dilute absorbent solution having concentration between 50-57%, discharged from the absorber 118, is bifurcated, wherein a first stream is pumped to the low temperature heat exchanger 108 and a second stream is pumped to the recovery heat exchanger 112. The volume of the first stream and the second stream can be equivalent or various. After being partly heated in the low temperature heat exchanger 108 and the recovery heat exchanger 112, the dilute absorbent solution is still heated. The partly heated first stream enters the high temperature heat exchanger 106 and the second stream is received in the heat reclaimer 120, from where, after taking heat, both the streams are mixed, and the heated dilute absorbent solution is conveyed to the high temperature generator 102.

The high temperature generator 102 is provided with a heat input, generally represented by numeral 122, adapted to boil the heated dilute refrigerant absorbent solution. The heat input, which is typically selected from steam, exhaust, or fuel firing, has a temperature in the range of 130-220° C. The heat input, received in the high temperature generator 102 through the line 122, boils the dilute absorbent solution having concentration between 50-57%, to provide a partly concentrated heated absorbent solution, as a result of vaporization of the refrigerant in the dilute absorbent solution. The heated absorbent solution from the high temperature generator 102 is conveyed to the high temperature heat exchanger 106, where it loses heat to the dilute partly heated absorbent solution circulated there through. The refrigerant vapors generated in the high temperature generator 102 are used as a heat source for providing both heating and refrigeration.

A portion of the refrigerant vapors, generally represented by numeral 124a, is communicated to the low temperature generator 110 for further concentration of the partly concentrated absorbent solution, and a portion of the refrigerant vapors, generally represented by numeral 124b, is communicated to the hot-water heat exchanger 104 for providing hot water that can be used for industrial applications. In the hot-water heat exchanger 104, water having temperature between 40-90° C. is circulated through the heat exchanger tubes, generally represented by numeral 126, which extracts heat from the refrigerant vapors, to become hot water having temperature between 45-95° C. The refrigerant vapors condense, to provide a first stream of refrigerant condensate which is discharged from the bottom of the hot-water heat exchanger 104 and collected.

The partly concentrated heated absorbent solution, after losing heat in the high temperature heat exchanger 106 to become a partly concentrated partly heated absorbent solution, is received in the low temperature generator 110, for further concentration. In the low temperature generator 110, heat from the refrigerant vapors is extracted to further concentrate the partly concentrated partly heated absorbent solution, so as to provide a concentrated heated absorbent solution having concentration between 62-64%. The refrigerant vapors condense, to provide a second stream of refrigerant condensate which is discharged from the low temperature generator 110 and mixed with the first stream of refrigerant condensate from the hot-water heat exchanger 104. The refrigerant condensate mixture is fed to the recovery heat exchanger 112 for extracting heat there from.

In an additional embodiment (not shown in Figure), the first stream of refrigerant condensate, leaving the hot-water heat exchanger, is circulated through the heat recovery heat exchanger, where heat is extracted there from and the cooled condensate is fed to at least one equipment selected from the condenser (114) and the evaporator (116). Further, the second stream of refrigerant condensate, leaving the low temperature generator (110), is circulated through the drain heat exchanger, where the heat is extracted there from and the cooled condensate is fed to condenser (114).

The concentrated heated absorbent solution having concentration between 62-64%, from the low temperature generator 110, is circulated through the low temperature heat exchanger 108, where it transfers heat to the dilute absorbent solution, thereby providing a concentrated cooled absorbent solution and a dilute partly heated absorbent solution. The cooled concentrated absorbent solution is sprayed in the absorber 118.

The refrigerant condensate, circulated through the recovery heat exchanger 112, loses heat to the dilute absorbent solution, to become a cooled refrigerant condensate. The cooled refrigerant condensate is conveyed to the condenser 114 for further condensation. The recovery heat exchanger 112 helps in reducing load on the condenser 114. The dilute absorbent solution is partly heated and traversed to the heat reclaimer 120 for further heating. The condenser 114 is provided in communication with the absorber 118 to receive the cooling water, through the line 130. The cooled refrigerant condensate, by rejecting heat to the circulated cooling water, further condenses in the condenser 114, to provide a further condensed cooled refrigerant which is sprayed in the evaporator 116, thereby completing a cycle.

The heat reclaimer 120 is provided only when the heat input is steam. The heat reclaimer 120 is provided in communication with the recovery heat exchanger 112 and the high temperature generator 102, to receive the dilute partly heated absorbent solution and the used heat input through the line 122. The left-over heat from the heat input i.e. steam, is extracted in the heat reclaimer 120, to provide the dilute heated absorbent solution which is fed to the high temperature generator 102. The steam condensate, thus generated, is discharged.

The various embodiments of the absorption chiller-heater apparatus of the present invention, illustrated in FIGS. 2-7, differ in the manner in which the dilute absorbent solution from the absorber 118 is heated and concentrated, through the low temperature heat exchanger 108, the high temperature heat exchanger 106, the recovery heat exchanger 112, the heat reclaimer 120, the high temperature generator 102 and the low temperature generator 110.

Figure 3:
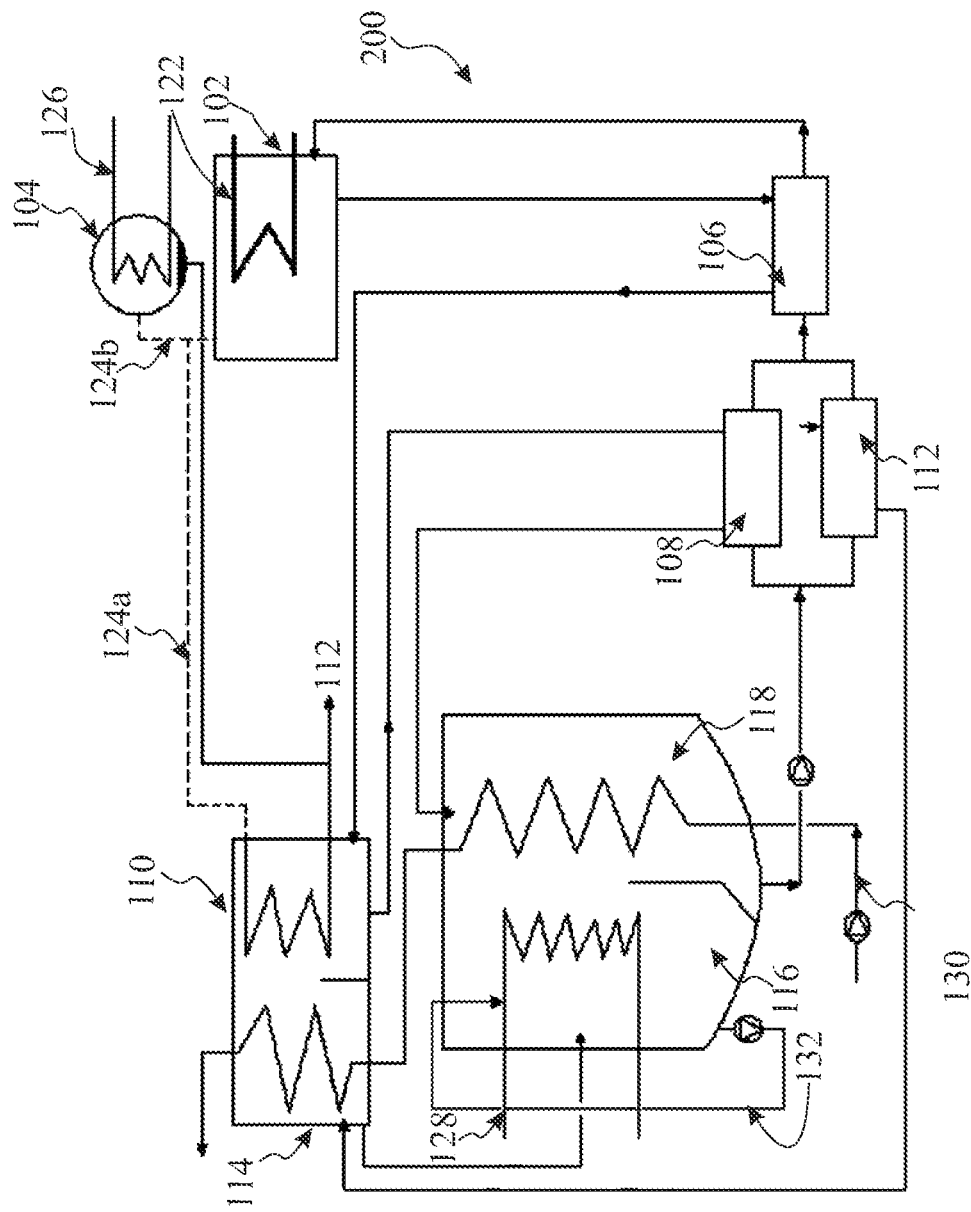
FIG. 3 illustrates an alternative embodiment of the absorption chiller-heater apparatus in accordance with the present invention.

Referring to FIG. 3, the absorption chiller-heater apparatus is illustrated without the heat reclaimer 120 shown in the FIG. 2, the embodiment is represented by numeral 200 in FIG. 3. In the embodiment 200 of the chiller-heater apparatus of the present invention, the dilute absorbent solution having concentration between 50-57%, discharged from the absorber 118, is bifurcated, wherein a first stream is pumped to the low temperature heat exchanger 108 and a second stream is pumped to the recovery heat exchanger 112. The volume of the first stream and the second stream can be equivalent or various. After being partly heated in the low temperature heat exchanger 108 and the recovery heat exchanger 112, the first stream and the second stream of the dilute partly heated absorbent solution are mixed, and the mixture is fed to the high temperature heat exchanger 106. In the high temperature heat exchanger 106, the dilute partly heated absorbent solution gains heat, to form the dilute heated absorbent, which is conveyed to the high temperature generator 102 for further concentration.

The partly concentrated heated absorbent solution generated in the high temperature generator 102 is circulated through the high temperature heat exchanger 106, where it transfers the heat to the dilute partly heated absorbent solution, to form the partly concentrated partly heated absorbent solution. The partly concentrated partly heated absorbent solution is conveyed to the low temperature generator 110, where, by extracting heat from the refrigerant vapors, received therein from the high temperature generator 102, the partly concentrated partly heated absorbent solution is further concentrated to provide the concentrated heated absorbent solution having concentration in the range of 62-64%. The concentrated heated absorbent solution is cooled in the low temperature heat exchanger 108 before being sprayed in the absorber 118, thereby completing the refrigeration cycle.

Figure 4:
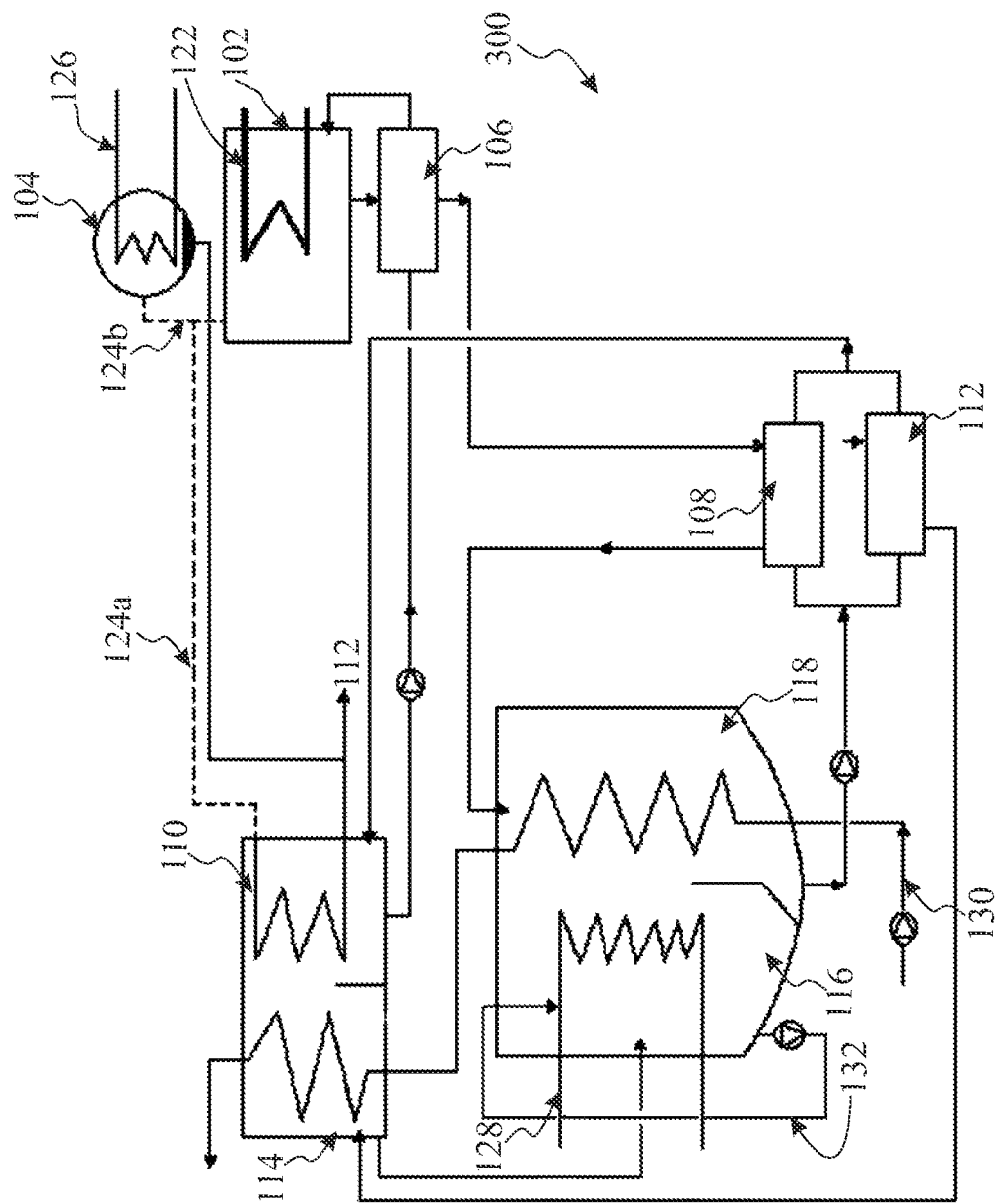
FIG. 4 illustrates another embodiment of the absorption chiller-heater apparatus in accordance with the present invention.

Referring to FIG. 4, an alternative embodiment of the absorption chiller-heater apparatus of the present invention is illustrated, wherein the heat reclaimer 120 shown in the FIG. 2 is not provided and the dilute absorbent solution is first concentrated in the low temperature generator 110, the embodiment is referred by numeral 300 in the FIG. 4. In the embodiment 300 of the chiller-heater apparatus of the present invention, the dilute absorbent solution having concentration between 50-57%, discharged from the absorber 118, is bifurcated, wherein a first stream is pumped to the low temperature heat exchanger 108 and a second stream is pumped to the recovery heat exchanger 112. The volume of the first stream and the second stream can be equivalent or various. After being partly heated in the low temperature heat exchanger 108 and the recovery heat exchanger 112, the first stream and the second stream, of the dilute partly heated absorbent solution, are mixed. The dilute partly heated absorbent solution having concentration between 50-57% is conveyed to the low temperature generator 110, where, by extracting heat from the refrigerant vapors, received therein from the high temperature generator 102, the dilute partly heated absorbent solution gets concentrated, to form the partly concentrated partly heated absorbent solution. The partly concentrated partly heated absorbent solution is conveyed to the high temperature generator 102 through the high temperature heat exchanger 106, where, in the high temperature high exchanger 106 the partly concentrated partly heated absorbent solution gains heat to become the partly concentrated heated absorbent solution, which is fed to the high temperature generator 102 for further concentration.

In the high temperature generator 102, the partly concentrated heated absorbent solution is boiled, using the heat input 122, to provide the concentrated heated absorbent solution having concentration between 62-64% and the refrigerant vapors. The concentrated heated absorbent solution is circulated through the high temperature heat exchanger 106, where it transfers the heat there from, to become a concentrated partly heated absorbent solution. The concentrated partly heated absorbent solution is further cooled in the low temperature heat exchanger 108, where it loses heat to the dilute absorbent solution circulated there through, to form the concentrated cooled absorbent solution which is sprayed in the absorber 118, thereby completing the refrigeration cycle.

Figure 5:
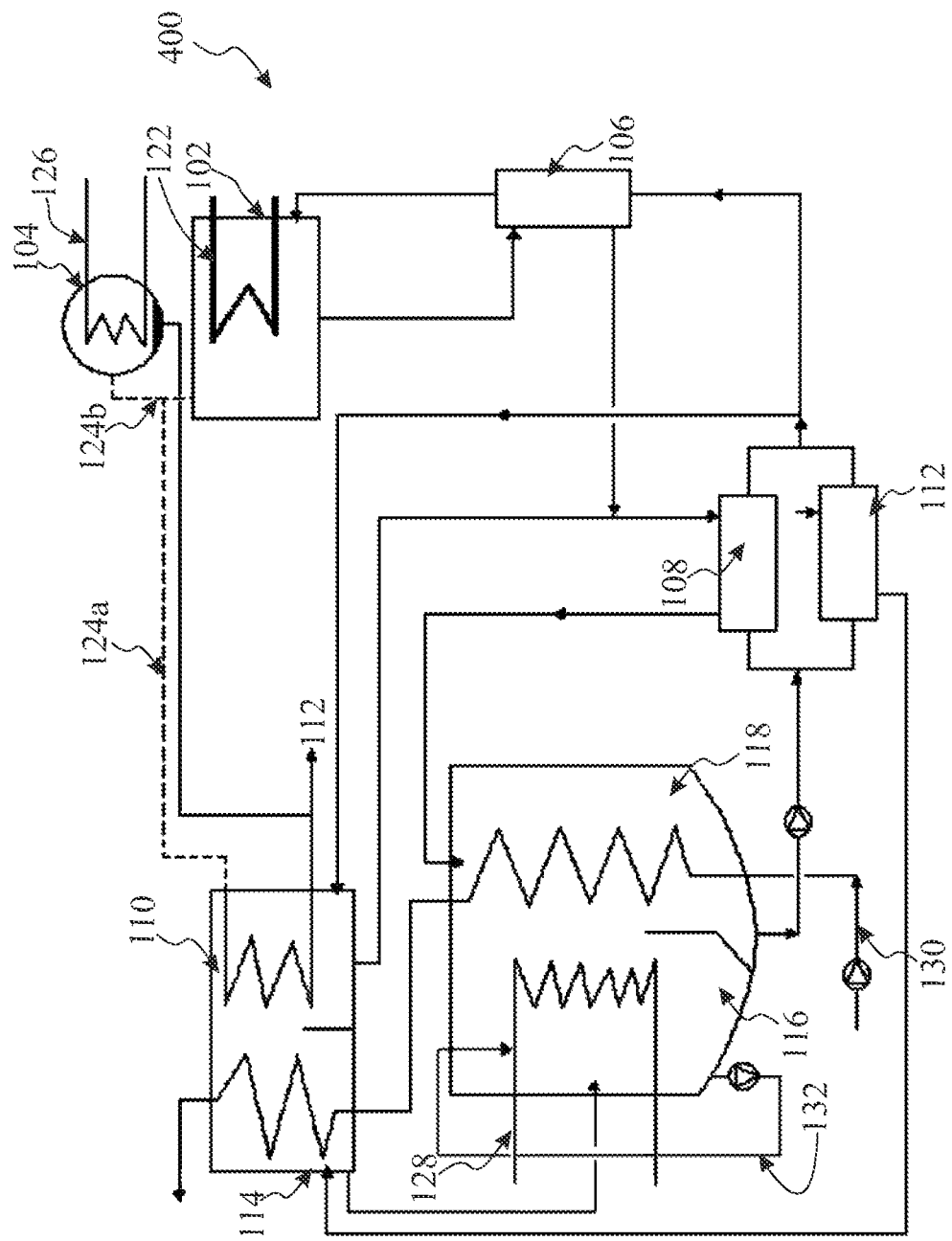
FIG. 5 illustrates yet another embodiment of the absorption chiller-heater apparatus in accordance with the present invention.

Referring to FIG. 5, an alternative embodiment of the absorption chiller-heater apparatus of the present invention is illustrated, wherein the heat reclaimer 120 shown in the FIG. 2 is not provided and the dilute absorbent solution is simultaneously concentrated in the low temperature generator 110 and the high temperature generator 102, the embodiment is referred in FIG. 5 by numeral 400. In the embodiment 400 of the chiller-heater apparatus of the present invention, the dilute absorbent solution having concentration between 50-57%, discharged from the absorber 118, is bifurcated, wherein a first stream is pumped to the low temperature heat exchanger 108 and a second stream is pumped to the recovery heat exchanger 112. The volume of the first stream and the second stream can be equivalent or various. After being partly heated in the low temperature heat exchanger 108 and the recovery heat exchanger 112, the first stream and the second stream, of the dilute partly heated absorbent solution, are mixed. The dilute partly heated absorbent solution, obtained by combining the first stream and the second stream, is bifurcated, wherein, a first portion is directly conveyed to the low temperature generator 110 and a second portion is conveyed to the high temperature generator 102 via the high temperature heat exchanger 106.

In the low temperature generator 110, the first portion of the dilute partly heated absorbent solution is concentrated by the refrigerant vapors received therein from the high temperature generator 102, to provide a first stream of the concentrated partly heated absorbent solution having concentration between 62-64%. In the high temperature heat exchanger 106, the second portion of the dilute partly heated absorbent solution gains heat, to form the dilute heated absorbent solution, which is conveyed to the high temperature generator 102 for concentration by the heat input 122. From the high temperature generator 102, the concentrated heated absorbent solution is communicated to the high temperature heat exchanger 106, where it loses partial heat to the dilute partly heated absorbent solution, to form a second stream of the concentrated partly heated absorbent solution having concentration between 62-64%. The first stream and the second stream of the concentrated partly heated absorbent solution are mixed and fed to the low temperature heat exchanger 108, where, it loses the remaining heat to the dilute absorbent solution, to become the concentrated cooled absorbent solution, which is sprayed in the absorber 118, thereby, completing the refrigeration cycle.

Figure 6:
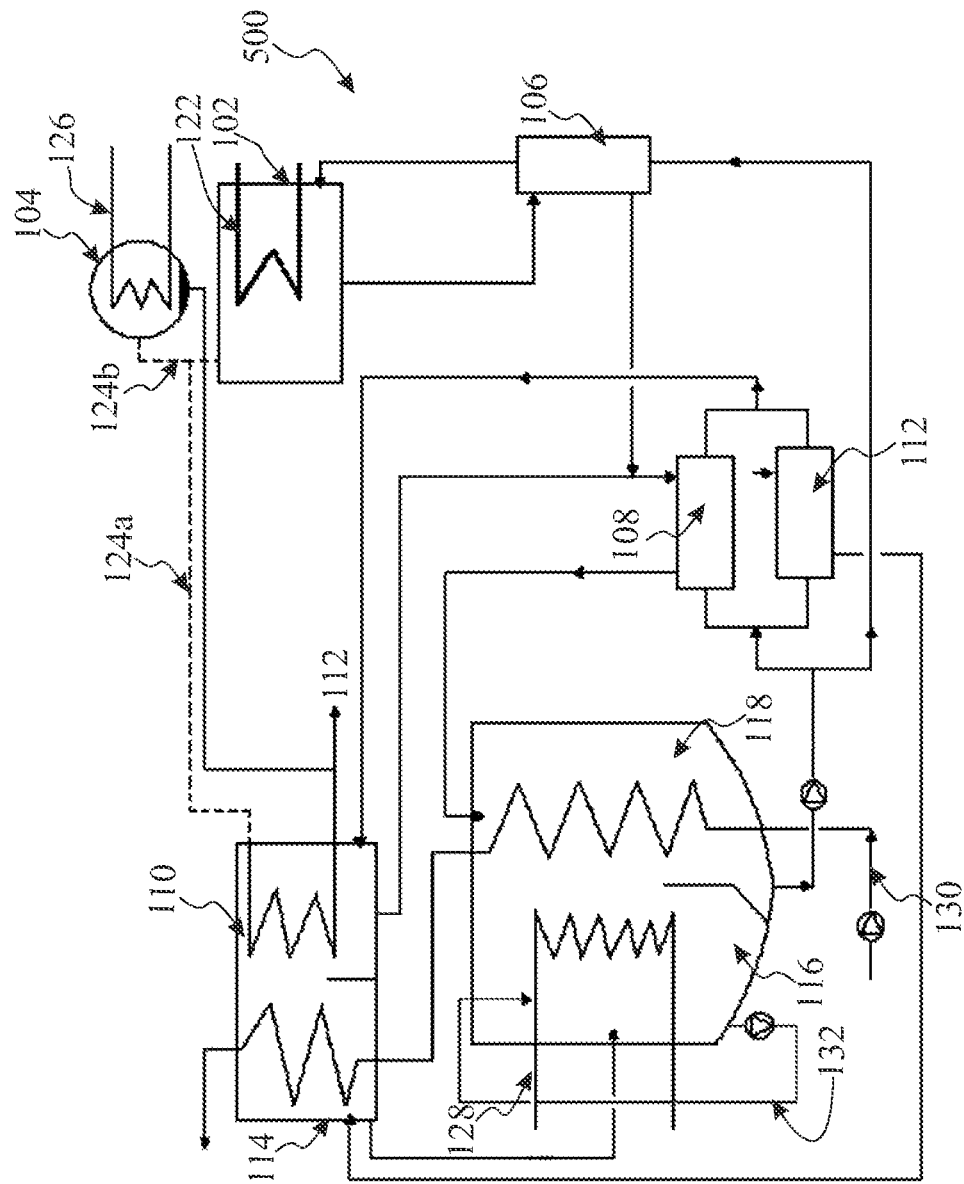
FIG. 6 illustrates still another embodiment of the absorption chiller-heater apparatus in accordance with the present invention.

Referring to FIG. 6, an alternative embodiment of the absorption chiller-heater apparatus of the present invention is illustrated, wherein the heat reclaimer 120 shown in the FIG. 2 is not provided and the dilute absorbent solution is simultaneously concentrated in the low temperature generator 110 and the high temperature generator 102, the embodiment is referred in FIG. 6 by numeral 500. In the embodiment 500 of the chiller-heater apparatus of the present invention, the dilute absorbent solution having concentration between 50-57%, discharged from the absorber 118, is bifurcated into a first stream and a second stream. The first stream of the dilute absorbent solution is further bifurcated, a first part is fed to the low temperature heat exchanger 108 and a second part is fed to the recovery heat exchanger 112. The second stream of the dilute absorbent solution is fed to the high temperature heat exchanger 106.

After being partly heated in the low temperature heat exchanger 108 and the recovery heat exchanger 112, the first part and the second part of the first stream of the dilute refrigerant absorbent solution, are combined, and the combined stream is conveyed to the low temperature generator 110. In the low temperature generator 110, using heat from the refrigerant vapors received therein from the high temperature generator 102, the dilute partly heated absorbent solution is concentrated to 62-64%, to generate a first portion of the concentrated partly heated absorbent solution. The second stream of the dilute absorbent solution gains heat in the high temperature heat exchanger 106 to become a dilute heated absorbent solution, which is conveyed to the high temperature generator 102, for concentrating the dilute heated absorbent solution using the heat input 122, to provide the concentrated heated absorbent solution having concentration between 62-64%. The concentrated heated absorbent solution transfers a portion of the heat to the dilute absorbent solution in the high temperature heat exchanger 106, to provide a second portion of the concentrated partly heated absorbent solution. The first portion and the second portion of the concentrated partly heated absorbent solution are combined, before passing through the low temperature heat exchanger 108, where, it loses the remaining heat to the dilute absorbent solution, to provide the concentrated cooled absorbent solution having concentration between 62-64%, which is sprayed in the absorber 118, thereby, completing the refrigeration cycle.

Figure 7:
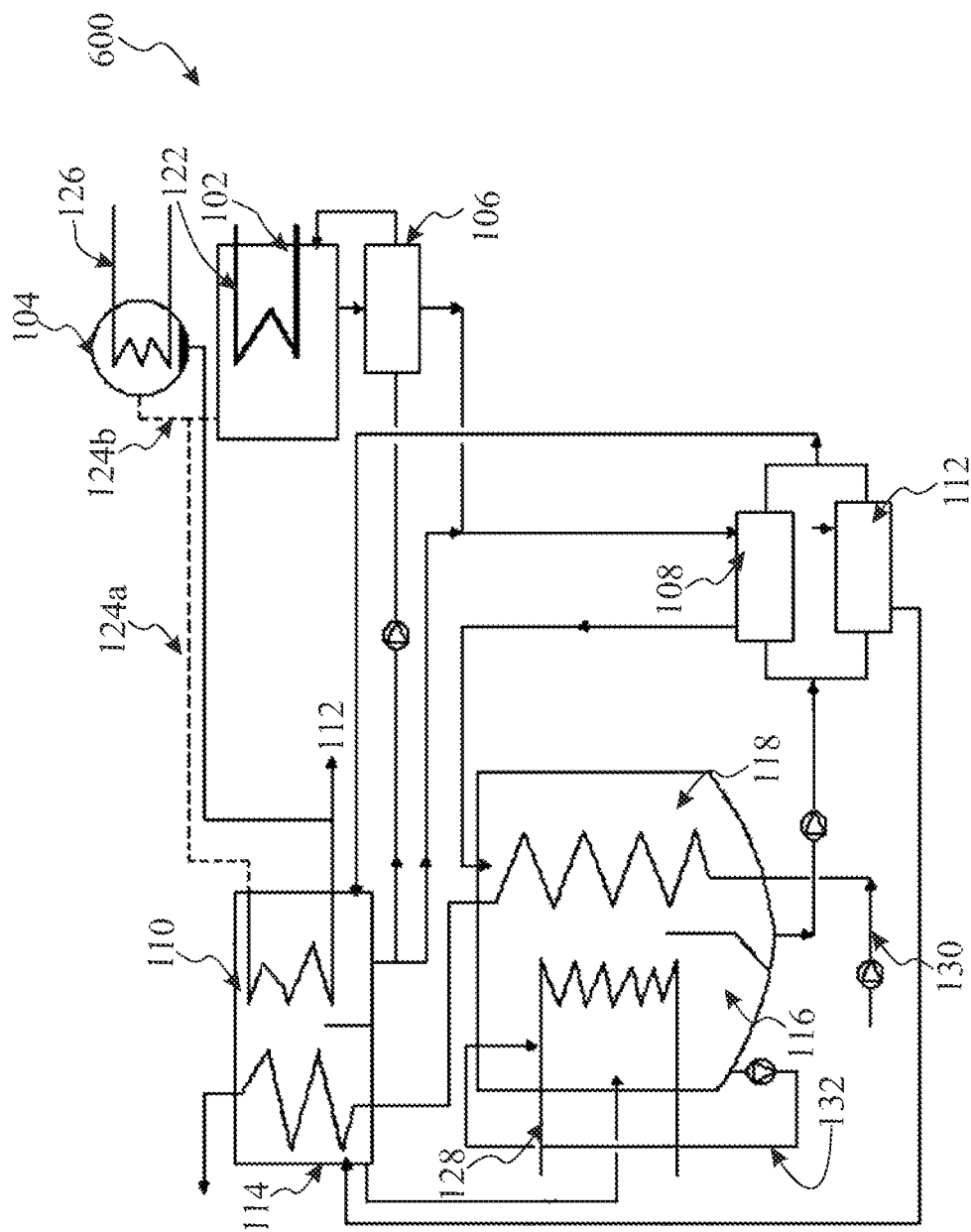
FIG. 7 illustrates an additional embodiment of the absorption chiller-heater apparatus in accordance with the present invention.

Referring to FIG. 7, an alternative embodiment of the absorption chiller-heater apparatus of the present invention is illustrated, wherein the heat reclaimer 120 shown in the FIG. 2 is not provided and the dilute absorbent solution is first concentrated in the low temperature generator 110, the embodiment is referred in FIG. 7 by numeral 600. In the embodiment 600 of the chiller-heater apparatus of the present invention, the dilute absorbent solution having concentration between 50-57%, discharged from the absorber 118, is bifurcated, wherein a first stream is pumped to the low temperature heat exchanger 108 and a second stream is pumped to the recovery heat exchanger 112. The volume of the first stream and the second stream can be equivalent or various. After being partly heated in the low temperature heat exchanger 108 and the recovery heat exchanger 112, the first stream and the second stream, of the dilute partly heated absorbent solution, are mixed. The dilute partly heated absorbent solution is conveyed to the low temperature generator 110, where, by extracting heat from the refrigerant vapors, received therein from the high temperature generator 102, the dilute partly heated absorbent solution gets concentrated, to form the partly concentrated partly heated absorbent solution.

The partly concentrated partly heated absorbent solution generated in the low temperature generator 110 is bifurcated, wherein, a first portion is fed to the high temperature heat exchanger 106 and a second portion is fed to the low temperature heat exchanger 108. The partly concentrated partly heated absorbent solution gains heat in the high temperature heat exchanger 106, providing the partly concentrated heated absorbent solution which is traversed to the high temperature generator 102. In the high temperature generator 102, the partly concentrated heated absorbent solution is concentrated by the heat input 122, to provide the concentrated heated absorbent solution having concentration between 62-64%. The concentrated heated absorbent solution, after partially losing heat in the high temperature heat exchanger 106, is combined with the second portion of the partly concentrated partly heated absorbent solution, and the combined stream is passed through the low temperature heat exchanger 108, where it exchanges heat with the dilute absorbent solution, to become the concentrated cooled absorbent solution having concentration between 62-64%, which is sprayed in the absorber 118, thereby, completing the refrigeration cycle.

TECHNICAL ADVANTAGES

The absorption chiller-heater apparatus as described herein above offers several advantages over similar products disclosed in the prior art, including but not limited to the realization of the following:

The absorption chiller-heater apparatus of the present invention utilizes a part of the direct heat used to heat hot water for generating refrigeration effect. Thus, the external heat input required for refrigeration is lower than the conventional chiller-heater cycles and hence the invention presents better efficiencies. The efficiency of the absorption chiller-heater apparatus of the present invention is 30-40% more in comparison to the conventional chiller-heater apparatus. As the quantum of the external heat source required for the new cycle is reduced, the size of the high temperature generator is also reduced which results in lower cost. The present invention further helps in obtaining chilled water required for various industrial purposes. The absorption chiller-heater further reduces the $CO_2$ emissions and is therefore environment friendly. The apparatus utilizes a single arrangement to produce heating and refrigeration effect. Thus, additional electrical and heat input or separate components are not required.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

In view of the wide variety of embodiments to which the principles of the present invention can be applied, it should be understood that the illustrated embodiments are exemplary only. While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

What is claimed is:

1. An absorption chiller-heater apparatus, for providing heating and refrigeration, said apparatus comprising: a high temperature generator (102), a hot-water heat exchanger (104), a high temperature heat exchanger (106), a low temperature generator (110), a low temperature heat exchanger (108), a recovery heat exchanger (112), a condenser (114), an evaporator (116), and an absorber (118), and optionally comprising: a heat reclaimer (120);

characterized in that:

the high temperature generator (102) is selectively connected in communication with a first set of equipment selected from the group of sets of equipment consisting of: (i) the hot-water heat exchanger (104), the high temperature heat exchanger (106), the low temperature generator (110), and the heat reclaimer (120); and (ii) the hot-water heat exchanger (104), the high temperature heat exchanger (106), and the low temperature generator (110);

the hot-water heat exchanger (104) is operatively connected to be in communication with a set of equipment selected from the high temperature generator (102) and the recovery heat exchanger (112), wherein, the hot-water heat exchanger (104) is operatively connected to at least one equipment selected from a group of equipments consisting of the condenser (114) and the evaporator (116), via the recovery heat exchanger (112);

the high temperature heat exchanger (106) is selectively connected in communication with a second set of equipment selected from the group of sets of equipment consisting of: (i) the high temperature generator (102), the low temperature generator (110), and the low temperature heat exchanger (108); (ii) the high temperature generator (102), the low temperature generator (110), the low temperature heat exchanger (108), and the recovery heat exchanger (112); (iii) the high temperature generator (102), the low temperature heat exchanger (108), and the recovery heat exchanger (112); and (iv) the high temperature generator (102), the low temperature heat exchanger (108), and the absorber (118);

the low temperature generator (110) is selectively connected in communication with a third set of equipment selected from the group of sets of equipment consisting of: (i) the high temperature generator (102), the high temperature heat exchanger (106), the low temperature heat exchanger (108), and the recovery heat exchanger (112); and (ii) the high temperature generator (102), the low temperature heat exchanger (108), and the recovery heat exchanger (112);

the low temperature heat exchanger (108) is operatively connected to be in communication with the low temperature generator (110), the high temperature heat exchanger (106), and the absorber (118);

the recovery heat exchanger (112) is selectively connected in communication with a fourth set of equipment selected from the group of sets of equipment consisting of: (i) the low temperature generator (110), the hot-water heat exchanger (104), the absorber (118), the condenser (114), and the heat reclaimer (120); (ii) the low temperature generator (110), the hot-water heat exchanger (104), the absorber (118), the condenser (114), and the high temperature heat exchanger (106); and (iii) the low temperature generator (110), the hot-water heat exchanger (104), the absorber (118), and the condenser (114);

the heat reclaimer (120) is operatively connected to be in communication with the recovery heat exchanger (112) and the high temperature generator (102);

the condenser (114) is operatively connected to be in communication with the recovery heat exchanger (112), the absorber (118), and the evaporator (116);

the evaporator (116) is operatively connected to be in communication with the condenser (114); and the absorber (118) is selectively connected in communication with a fifth set of equipment selected from the group of sets of equipment consisting of: (i) the condenser (114), the low temperature heat exchanger (108), and the recovery heat exchanger (112); and (ii) the condenser (114), the low temperature heat exchanger (108), the recovery heat exchanger (112), and the high temperature heat exchanger (106).

2. The apparatus as claimed in claim 1, wherein for providing heating and refrigeration, said apparatus comprises:

the high temperature generator (102), to receive a heated absorbent solution having concentration between 50-62% from the high temperature heat exchanger (106), being adapted to boil the absorbent solution using heat input having temperature between 130-220° C., to provide a heated absorbent solution having concentration between 57-64% which is passed to the high temperature heat exchanger (106), and refrigerant vapors which are conveyed to the hot-water heat exchanger (104) and the low temperature generator (110);

the hot-water heat exchanger (104), to receive a portion of the refrigerant vapors from the high temperature generator (102), being adapted to transfer the heat there from to water, to provide hot water having temperature between 45-95° C., condensing the refrigerant vapors to form a refrigerant condensate to be circulated to at least one equipment selected from a group of equipments consisting of the condenser (114) and the evaporator (116), via the recovery heat exchanger (112);

the high temperature heat exchanger (106), to receive a absorbent solution having concentration between 50-62%, the absorbent solution being selected from the group consisting of a partly heated absorbent solution and a cooled absorbent solution, from at least one equipment selected from the group consisting of the low temperature heat exchanger (108), the recovery heat exchanger (112), the low temperature generator (110), and the absorber (118), and a heated absorbent solution having concentration between 57-64% from the high temperature generator (102), being adapted to transfer heat between the absorbent solutions, to provide a heated absorbent solution having concentration between 50-62% which is fed to the high temperature generator (102) and a partly heated absorbent solution having concentration between 57-64% to be communicated to an equipment selected from the group consisting of the low temperature generator (110) and the low temperature heat exchanger (108);

the low temperature generator (110), to receive a portion of the refrigerant vapors from the high temperature generator (102), and a partly heated absorbent solution having concentration between 50-62% from at least one equipment selected from the group consisting of the high temperature heat exchanger (106), the low temperature heat exchanger (108), and the recovery heat exchanger (112), being adapted to use the heat from the refrigerant vapors to boil the absorbent solution, to provide a heated absorbent solution having concentration between 57-64% which is communicated to at least one equipment selected from the group consisting of the low temperature heat exchanger (108) and the high temperature heat exchanger (106), the refrigerant vapors becoming a refrigerant condensate which is fed to the recovery heat exchanger (112);

the low temperature heat exchanger (108), to receive a cooled absorbent solution having concentration between 50-57% from the absorber (118), and a heated absorbent solution having concentration between 62-64% from at least one equipment selected from the group consisting of the low temperature generator (110) and the high temperature heat exchanger (106), being adapted to transfer heat between the absorbent solutions, to provide a cooled absorbent solution having concentration between 62-64% which is sprayed in the absorber (118), and a partly heated absorbent solution having concentration between 50-57% which is conveyed to at least one equipment selected from the group consisting of the low temperature generator (110) and the high temperature heat exchanger (106);

the recovery heat exchanger (112), to receive the cooled absorbent solution having concentration between 50-57% from the absorber (118), and the refrigerant condensate from at least one equipment selected from the group of equipments consisting of the low temperature generator (110) and the hot-water heat exchanger (104), being adapted to extract heat from the refrigerant condensate to the absorbent solution, the cooled refrigerant condensate is transmitted to the condenser (114), and a partly heated absorbent solution having concentration between 50-57% is provided, which is conveyed to at least one equipment selected from the group consisting of the high temperature heat exchanger (106), and the low temperature generator (110);

the condenser (114), to receive the cooled refrigerant condensate from the recovery heat exchanger (112) and cooling water from the absorber (118), being adapted to further condense the cooled refrigerant condensate, to provide a further condensed cooled refrigerant;

the evaporator (116), cooperating with the absorber (118), adapted to receive the further condensed cooled refrigerant from the condenser (114) and water having temperature in the range of 10-20° C., the further condensed cooled refrigerant absorbs heat from the water and becomes refrigerant vapors, and thereby provides chilled water having temperature in the range of 0-10° C.; and the absorber (118), cooperating with the evaporator (116) to receive the refrigerant vapors, wherein the cooled absorbent solution having concentration between 62-64% is sprayed in the absorber (118), being adapted to absorb the refrigerant vapors, causing the absorbent solution to dilute, thereby becoming a cooled absorbent solution having concentration between 50-57% which is circulated to at least one equipment selected from the group consisting of the low temperature heat exchanger (108), the recovery heat exchanger (112) and the high temperature heat exchanger (106); cooling water is circulated through the absorber (118) to remove the heat of dilution.

3. The apparatus as claimed in claim 1, wherein said apparatus comprises the heat reclaimer (120) to receive the partly heated absorbent solution having concentration between 50-57% from the recovery heat exchanger (112) and a used heat input from the high temperature generator (102), being adapted to extract the remaining heat from the heat input to the partly heated absorbent solution, to provide a heated absorbent solution having concentration between 50-57%, which is conveyed to the high temperature generator (102).

4. The apparatus as claimed in claim 1, wherein the recovery heat exchanger (112) is at least one equipment selected from the group of equipments consisting of a drain heat exchanger and a heat recovery heat exchanger, wherein the heat recovery heat exchanger is operatively connected to be in communication with the hot-water heat exchanger (104) for receiving the refrigerant condensate.

5. The apparatus as claimed in claim 1, wherein refrigerant-absorbent pair is water-lithium-bromide (Li—Br).

6. The apparatus as claimed in claim 1, wherein heat input is selected from the group consisting of steam, fuel, and exhaust gas.

7. A method for providing refrigeration and heating using an absorption chiller-heater apparatus, said method comprising the following steps:

boiling a heated absorbent solution having concentration between 50-62% in the high temperature generator (102) using a heat input having temperature between 130-220° C., providing a heated first absorbent solution having concentration between 57-64%, and releasing refrigerant vapors;

receiving a portion of the refrigerant vapors in a hot-water heat exchanger (104) for heating water, the refrigerant vapors condensing to become a refrigerant condensate, and providing hot water having temperature between 45-95° C.;

extracting heat from the heated first absorbent solution leaving the high temperature generator (102) in a high temperature heat exchanger (106), providing a partly heated first absorbent solution having concentration between 57-64%;

concentrating a partly heated absorbent solution having concentration between 50-62% in a low temperature generator (110), by using a portion of the refrigerant vapors from the high temperature generator (102), the refrigerant vapors condensing in the process, providing a heated second absorbent solution having concentration between 57-64%;

transmitting heat from the heated second absorbent solution leaving the low temperature generator (110), in a low temperature heat exchanger (108), providing a cooled second absorbent solution having concentration between 57-64%;

extracting heat from the refrigerant condensate leaving the hot-water heat exchanger (104) and the low temperature generator (110), in a recovery heat exchanger (112) which comprises at least one equipment selected from a drain heat exchanger and a heat recovery heat exchanger, providing a cooled refrigerant condensate;

receiving the cooled refrigerant condensate in a condenser (114), for further condensation, by giving heat to cooling water circulated there through, providing a further condensed cooled refrigerant;

passing water having temperature between 10-20° C. through an evaporator (116), in which, the further condensed cooled refrigerant absorbs heat from the water to form refrigerant vapors, providing chilled water having temperature between 0-10° C.;

absorbing the refrigerant vapors released in the evaporator (116), in an absorber (118) which receives a cooled absorbent solution having concentration between 62-64%, the absorption resulting in dilution of the absorbent solution to 50-57% concentration, the heat of dilution generated during the process is removed by passing cooling water through the absorber (118);

heating the absorbent solution having concentration between 50-57%, in at least one equipment selected from the group consisting of the low temperature heat exchanger (108), the recovery heat exchanger (112), and the high temperature heat exchanger (106), providing a heated absorbent solution having concentration between 50-57%; and concentrating the heated absorbent solution in at least one equipment selected from the group consisting of the low temperature generator (110) and the high temperature generator (102).

8. The method as claimed in claim 7, which includes the step of transferring heat from the heated first absorbent solution to the heated second absorbent solution in the high temperature heat exchanger (106).

9. The method as claimed in claim 7, which includes the step of concentrating the partly heated first absorbent solution, having concentration between 57-62%, in the low temperature generator (110).

10. The method as claimed in claim 7, which includes the step of boiling the heated second absorbent solution, having concentration between 57-62%, in the high temperature generator (102).

11. The method as claimed in claim 7, which includes the step of extracting heat from the partly heated first absorbent solution in the low temperature heat exchanger (108).

12. The method as claimed in claim 7, which includes the step of extracting the left-over heat from the used heat input, in a heat reclaimer (120), for heating the absorbent solution leaving the absorber (118).

13. The method as claimed in claim 7, which includes the step of extracting heat from the refrigerant condensate leaving the hot-water heat exchanger (104) in the heat recovery heat exchanger.

* * * * *

UNITED STATES PATENT AND TRADEMARK OFFICE
CERTIFICATE OF CORRECTION

| | | |
|---|---|---|
| PATENT NO. | : 8,839,635 B2 | Page 1 of 1 |
| APPLICATION NO. | : 13/032675 | |
| DATED | : September 23, 2014 | |
| INVENTOR(S) | : Balu Radhakrishnan et al. | |

It is certified that error appears in the above-identified patent and that said Letters Patent is hereby corrected as shown below:

On the title page: item (75) the name of the first inventor should read:

Balu Radhakrishnan, Pune (IN);

Signed and Sealed this
Sixteenth Day of December, 2014

Michelle K. Lee
*Deputy Director of the United States Patent and Trademark Office*